US008020600B2

(12) United States Patent
Kobayashi

(10) Patent No.: US 8,020,600 B2
(45) Date of Patent: Sep. 20, 2011

(54) SHEET STICKING APPARATUS

(75) Inventor: Kenji Kobayashi, Tokyo (JP)

(73) Assignee: Lintec Corporation, Tokyo (JP)

( * ) Notice: Subject to any disclaimer, the term of this patent is extended or adjusted under 35 U.S.C. 154(b) by 201 days.

(21) Appl. No.: 12/212,069

(22) Filed: Sep. 17, 2008

(65) Prior Publication Data

US 2009/0084503 A1 Apr. 2, 2009

(30) Foreign Application Priority Data

Oct. 2, 2007 (JP) ................................ 2007-258550

(51) Int. Cl.
*B29C 65/48* (2006.01)

(52) U.S. Cl. ....................................... 156/443; 493/405

(58) Field of Classification Search .................. 156/443, 156/442.1, 476, 477.1, 227; 412/22; 270/58.07, 270/52.13; 493/405
See application file for complete search history.

(56) References Cited

U.S. PATENT DOCUMENTS

| | | | | |
|---|---|---|---|---|
| 5,785,804 | A * | 7/1998 | Kovacs et al. | 156/443 |
| 2004/0060645 | A1* | 4/2004 | Pieda et al. | 156/443 |

FOREIGN PATENT DOCUMENTS

| | | | | |
|---|---|---|---|---|
| JP | 2006-181991 | A | 7/2006 |
| WO | 2006-070569 | A1 | 7/2006 |
| WO | 2006-103911 | A1 | 10/2006 |

OTHER PUBLICATIONS

Chinese Office Action for Application No. 2008-10169204.2 dated Apr. 8, 2011.

* cited by examiner

*Primary Examiner* — Khanh Nguyen
*Assistant Examiner* — John Blades
(74) *Attorney, Agent, or Firm* — Lowe Hauptman Ham & Berner LLP

(57) ABSTRACT

A sheet sticking apparatus includes a first feeding device for feeding out a first sheet having an adhesive layer on one surface thereof, a second feeding device for feeding out a second sheet, and a folding device for folding the second sheet. The sheet sticking apparatus further includes a pressing device for sticking the folded second sheet to the adhesive layer of the first sheet so as to overlap the folded second sheet and the adhesive layer of the first sheet together, and for pressing the first sheet in a state where the adhesive layer of the first sheet is partially exposed out of the second sheet.

6 Claims, 3 Drawing Sheets

SHEET STICKING APPARATUS

RELATED APPLICATIONS

The present application is based on, and claims priority from, Application Number 2007-258550, filed Oct. 2, 2007, the disclosure of which is hereby incorporated by reference herein in its entirety.

BACKGROUND OF THE INVENTION

1. Field of the Invention

The present invention relates to a sheet sticking apparatus, and more particularly to a sheet sticking apparatus capable of sticking a sheet to an adherend with confidential information concealed.

2. Description of the Related Art

Recently, mail-order sale has become widely used and articles are delivered to consumers by deliverers in place of sellers. Consequently, leaking of information about the products such as the product name and price may be caused through the delivery slips. These information identify the products bought by the consumers, therefore such information are confidential information greatly concerning privacy of the consumers. In view of eliminating the risk of theft, it is understood that such information bear confidentiality.

A label sticking apparatus is disclosed in the patent document 1. The label sticking apparatus performs printing letters in a process of feeding out a first label and a second label, and sticking a non-printing surface side of the second label to an adhesive layer side of the first label, and then sticking the adhesive layer exposed outside of the periphery of the second label to an adherend, thereby allowing the second label to be held between the first label and the adherend.

Patent Document 1: Japanese Patent Application Laid-Open No. 2006-181991

SUMMARY OF THE INVENTION

However, in the label sticking apparatus disclosed in the patent document 1, because the plane area of the second label is smaller than that of the first label, the printing area of the second label becomes small. Accordingly, there is such a disadvantage that it becomes incapable of responding to when confidential information increases.

In this case, although it is possible to enlarge the area of the second label along with enlarging the area of the first label, then again, that causes a disadvantage for handling since the first label becomes too large. For example, when the area of the first label is enlarged, and when the area of an adherend surface of the adherend is small, the first label is to be protruded out of the periphery of the adherend, that causes unintended stripping and ripping.

The present invention has been made in view of the above disadvantages, and its object is to provide a sheet sticking apparatus capable of responding to increase in information volume including confidential information without having to enlarge an adhesive area of a sheet corresponding to an adherend.

MEANS FOR SOLVING THE PROBLEMS

In order to achieve the above object, a sheet sticking apparatus according to the present invention adopts such an arrangement that includes: a first feeding means for feeding out a first sheet having an adhesive layer on one surface thereof; a second feeding means for feeding out a second sheet; a folding means for folding the second sheet; and a pressing means for sticking the folded second sheet to the adhesive layer side of the first sheet so as to be overlapped together, and for pressing the first sheet in a state where a part of the adhesive layer is exposed to stick on an adherend.

And, the present invention may adopt such an arrangement that includes: a first feeding means for feeding out a first raw sheet in which a first sheet having an adhesive layer is temporarily stuck to one surface of a strip-shaped first release liner; a second feeding means for feeding out a second raw sheet in which a second sheet is temporarily stuck to one surface of a strip-shaped second release liner through an adhesive layer; a folding means for folding the second sheet after peeling the second sheet from the second release liner; a pressing means for overlapping the folded second sheet with the adhesive layer side of the first sheet after peeling the first sheet from the first release liner, and for pressing the first sheet in a state where a part of the adhesive layer is exposed to stick on an adherend.

Also, the folding means may be provided with a lifting means capable of moving the folded second sheet upward and downward.

Further, in the present invention, a first and a second printing means may be provided on respective feeding out pathways of the first sheet and the second sheet.

Furthermore, it is preferable to be arranged that the second sheet is formed to be substantially rectangular shaped, and when the middle portion is formed as a first area, and both sides thereof are respectively formed as a second and a third areas, the folding means folds the second sheet into three in the order of the second area and the third area so as to be mutually overlapped together, and a certain area along the folding edge in the second area in a state of being folded into three is not covered with the third area to form an adhesive margin toward the adhesive layer.

Still further, such an arrangement may be adopted that the folded second sheet is stuck to the adhesive layer in a state of partially protruding out of the exterior edge of the first sheet.

Yet still further, such an arrangement may be adopted that the folded second sheet is stuck to the adhesive layer in a state of not protruding out of the exterior edge of the first sheet.

According to the present invention, it is arranged that the second sheet being in a folded state is overlapped with the adhesive layer side of the first sheet, and in such a state, the adhesive layer exposed outside of the second sheet is stuck to the adherend. Therefore, the area of the pre-folding second sheet can be formed to be larger than the area of the first sheet, thereby allowing to sufficiently respond to increase in information volume by printing on the second sheet which is enlarged in area.

And, according to the sheet sticking apparatus using raw sheets in which the first and the second sheets are temporarily stuck to the first and the second release liners respectively, a continuous sheet sticking operation can be achieved efficiently.

Also, according to the arrangement that the printing means is provided with respect to each feeding-out pathway of each sheet, variable information corresponding to the adherend can be printed.

Further, by providing the lifting means capable of moving the folded second sheet upward and downward, the adhesive layer of the first sheet can be prevented from sticking to other parts when overlapping the second sheet with the first sheet.

Furthermore, because it is arranged that a part of the second area is stuck to the adhesive layer when the second sheet is folded into three, the folded posture is not loosened when the folded second sheet is held by the pressing means in a state of being stuck to the first sheet, and the second sheet can be prevented from being kinked irregularly to be sandwiched between the first sheet and the adherend.

Still further, in a state where the folded second sheet is partially protruding out of the exterior edge of the first sheet, that allows to bring awareness of the existence of the second sheet, easily.

Yet still further, in a state where the folded second sheet is not protruding out of the exterior edge of the first sheet, that allows to achieve further enhancement of concealment performance of the second sheet.

DETAILED DESCRIPTION OF THE PREFERRED EMBODIMENT

Hereinafter, an embodiment of the present invention will be described with reference to the accompanying drawings.

Figure 1:
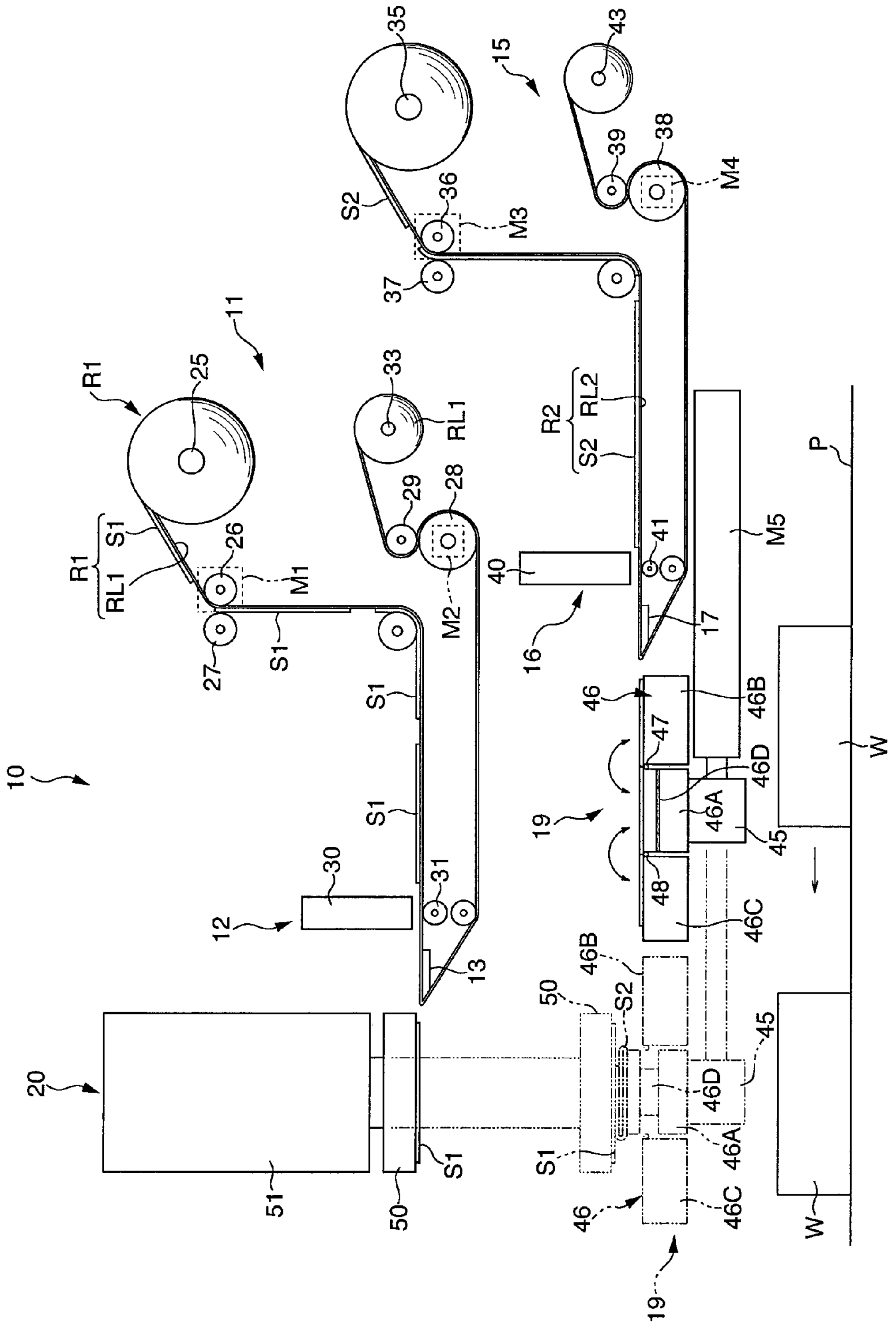
FIG. 1 is a schematic front view of a sheet sticking apparatus according to the embodiment.

FIG. 1 shows a schematic front view of a sheet sticking apparatus according to the present embodiment. In the drawing, a sheet sticking apparatus 10 includes a first feeding means 11 for feeding out a first raw sheet R1 wound round in a roll shape in which one surface of a first sheet S1 is provided with an adhesive layer and is temporarily stuck to a strip-shaped first release liner RL1; a first printing means 12 which is provided on the pathway of feeding out the first raw sheet R1 for performing predetermined printing on the first sheet S1; a first peel plate 13 for peeling off the first sheet S1 from the first release liner RL1 by sharply folding back the first release liner RL1; a second feeding means 15 for feeding out a roll shaped second raw sheet R2 in which a second sheet S2 is temporarily stuck to a strip-shaped second release liner RL2 through an adhesive layer; a second printing means 16 which is provided on the pathway of feeding out the second raw sheet R2 for performing predetermined printing on the second sheet S2; a second peel plate 17 for peeling off the second sheet S2 from the second release liner RL2; a folding means 19 for folding the second sheet S2; and a pressing means 20 for sucking and holding the first sheet S1, and also for pressing and sticking the adhesive layer which is exposed outside of the second sheet S2 to an adherend W in a united state so that the adhesive layer side (lower surface side in FIG. 1) of the first sheet S1 sticks overlapping on the folded second sheet S2.

Figure 3:
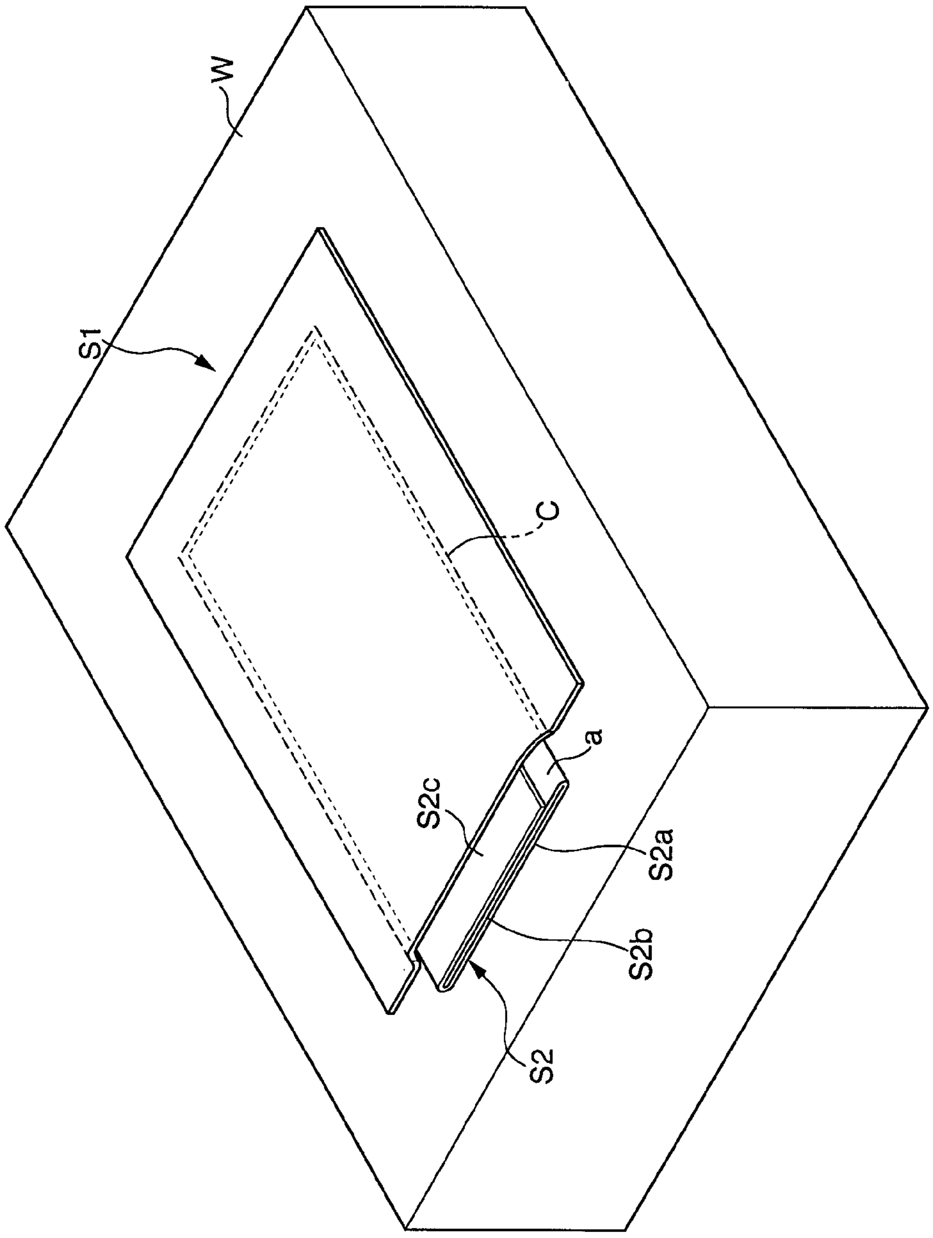
FIG. 3 is a schematic perspective view showing a state where the first and the second sheets are stuck to an adherend.

A length along the sheet feeding out direction of the second sheet S2 is set to be longer than that of the first sheet S1. Therefore, a plane area of the second sheet S2 is larger than that of the first sheet S1, thereby allowing for response to even when print information to be printed on the second sheet S2 increases. And, as shown in FIG. 3, a perforated-line C is formed on the first sheet S1 along a substantially U-shaped track, and the open side of the U-shape is formed so as to be positioned at one edge side of the first sheet S1 in the longitudinal direction. In this regard, the means for temporarily sticking the second sheet S2 with the second release liner RL2 is pseudo-adhesion, which has a certain extent of adhesion without dropping off the second sheet S2 when the second release liner RL2 and the second sheet S2 are in a laminated state, and it is not to stick again after their detachment because it is non-adherent. The pseudo-adhesive layer may be provided on either the second release liner RL2 side or the second sheet S2 side, and may be a combination of the second release liner RL2 side and the second sheet S2 side so that a pair of the two layers become pseudo-adhesion.

The first feeding means 11 includes a support roller 25 for supporting the first raw sheet R1; a drive roller 26 which is driven by a motor M1; a pinch roller 27 for pinching the first raw sheet R1 between the drive roller 26; and a drive roller 28 which is driven by a motor M2; a pinch roller 29 for pinching the first release liner RL1 between the drive roller 28; and a winding roller 33 for winding the first release liner RL1. In this regard, the motors M1 and M2 are linked, and are formed to be capable of normal rotation and reverse rotation in the feeding out direction of the first raw sheet R1 and the opposite direction thereof, and then are controlled by a tension detecting means and a controlling means (not shown) so that the tension of the first raw sheet R1 positioned between the drive rollers 26 and 28 is to be a predetermined value. Also, the winding roller 33 is tension-controlled by a motor (not shown) so that the tension of the first release liner RL1 positioned between the pinch roller 29 and the winding roller 33 to be a predetermined tension.

The first printing means 12 includes a first print-head 30 and a first platen roller 31. The first printing means 12 may be arranged with, not particularly limited but, for example, a thermal head printer, a laser printer, an ink-jet printer, and a dot impact printer, and the like. And, the first printing means 12 is connected to a control device (not shown) to perform printing by calling data stored in a host computer (not shown) when a predetermined printing instruction is given.

The second feeding means 15 includes a support roller 35 for supporting the second raw sheet R2; a drive roller 36 which is driven by a motor M3; a pinch roller 37 for pinching the second raw sheet R2 between the drive roller 36; and a drive roller 38 which is driven by a motor M4; a pinch roller 39 for pinching the second release liner RL2 between the drive roller 38; and a winding roller 43 for winding the second release liner RL2. In this regard, the motors M3 and M4 are also linked mutually, and are formed to be capable of normal rotation and reverse rotation in the feeding out direction of the second raw sheet R2 and the opposite direction thereof, and then are controlled by a tension detecting means and a controlling means (not shown) so that the tension of the second raw sheet R2 positioned between the drive rollers 36 and 38 is to be a predetermined value. Also, the winding roller 43 is tension-controlled by a motor (not shown) so that the tension of the second release liner RL2 positioned between the pinch roller 39 and the winding roller 43 to be a predetermined tension.

The second printing means 16 includes a second print-head 40 and a second platen roller 41. The second printing means 16 may be arranged with, similarly to the first printing means 12, various printers such as a thermal head printer. And, the second printing means 16 is also connected to a control device (not shown) to print on the second sheet S2 when a predetermined printing instruction is given.

The folding means 19 includes a linear motor M5; a moving block 45 which is provided to be movable advancing and retracting toward the right and left directions in FIG. 1 by the linear motor M5; and a folding plate 46 supported by the moving block 45. The folding plate 46 includes a middle plate 46A; a first and a second rotating plates 46B and 46C which are located on either side of the middle plate 46A, and are rotatably provided respectively through rotary shafts 47 and 48 being rotatably supported by respective brackets (not shown). The folding plate 46 is arranged to be maintained at a position where the right edge side of the upper surface of the first rotating plate 46B approaches the closest to the leading edge of the second peel plate 17 as the initial position, and on the other hand, to be moved to a position indicated in the dashed-two dotted lines in FIG. 1 when folding the second sheet S2 and overlapping it with the first sheet S1. In this regard, suction holes (not shown) are formed on the upper surface side of the folding plate 46, so as to suck and hold the second sheet S2 after peeling it from the second release liner RL2. Also, the first and the second rotating plates 46B and 46C are formed to be rotatable around the rotary shafts 47 and 48 as the respective centers of rotation by a driving means (not shown). Additionally, the upper surface of the middle plate 46A is formed to be movable upward and downward by a lifting means 46D including a cylinder so that the adhesive layer of the first sheet S1 is not to stick to the upper surfaces of the first and the second rotating plates 46B and 46C when overlapping the second sheet S2 with the first sheet S1.

The pressing means 20 includes a suction plate 50; and a cylinder 51 which supports the suction plate 50 to be movable advancing and retracting with respect to the adherend W. The suction plate 50 is provided with a number of suction holes on the lower surface side thereof so as to suck and hold the printing surface side of the first sheet S1, and to press and stick the first sheet S1 to the adherend W in a state where the folded second sheet S2 is stuck to the adhesive layer side of the first sheet S1 to be united therewith. In this regard, the pressing means 20 is provided to be displaceable in a direction perpendicular to the paper surface in FIG. 1 through a displacement means (not shown), whereby a position in the direction to overlap the first and the second sheets S1 and S2 together becomes adjustable.

Next, an overall operation of the sheet sticking apparatus 20 in accordance with the embodiment will be described. Here, for convenience of explanation, the printing surface of the first sheet S1 is printed with open information such as destination about a product via home-delivery contained in an adherend W including a package case, while the printing surface of the second sheet S2 is printed with the confidential information such as a product name and a price, and notification information such as an advertising literature and a commercial message, campaign information, other informational messages, and the like.

When a sensor (not shown) detects that the adherend W reaches at a predetermined position on a conveyor pathway P, the first adhesive sheet S1 and the second adhesive sheet S2, which have been in a standby state on the upstream side of the first and the second print-heads 30 and 40, are fed out respectively; and the open information and the notification information are printed respectively in synchronization with their feeding out timing. The first sheet S1 after completion of printing is peeled off at the leading edge of the first peel plate 13 to be sucked and held by the suction plate 50 and then stands by there. On the other hand, the second sheet S2 after completion of printing is peeled off at the leading edge of the second peel plate 17 to be sucked and held on the upper surface of the folding plate 46.

Figure 2A:
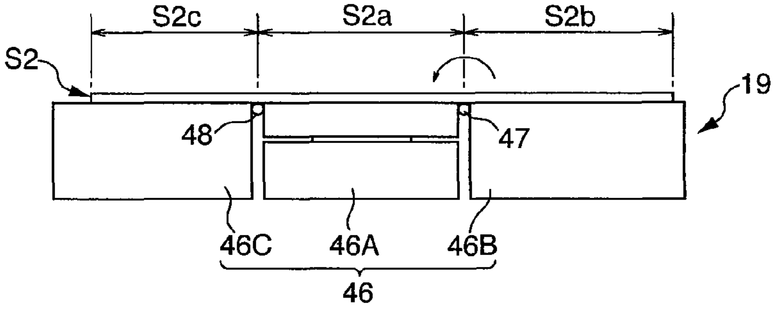
FIG. 2A to FIG. 2D are schematic front views for illustrating a folding operation of a second sheet and an overlapping operation of the second sheet with a first sheet.
Figure 2B:
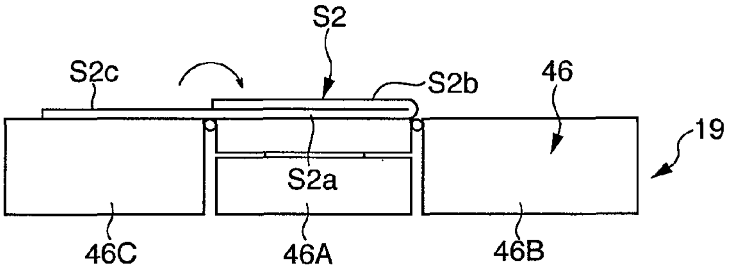
Figure 2C:
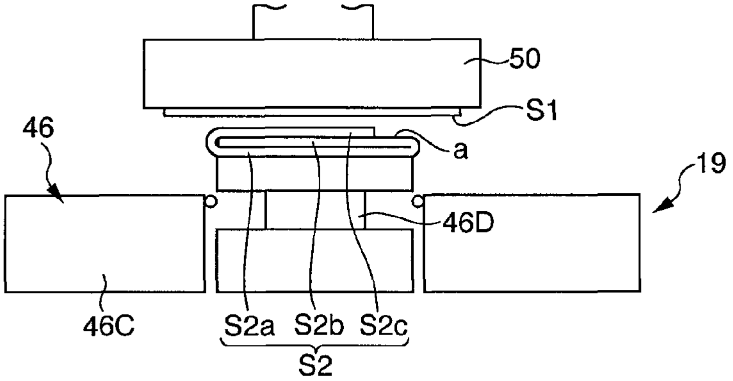

In the second sheet S2 which is sucked by the folding plate 46, as shown in FIG. 2A, an area located on the middle plate 46A is formed as a first area S2*a*, while areas located on the first rotating plate 46B and the second rotating plate 46C are formed as a second area S2*b* and a third area S2*c*, respectively. And, the first rotating plate 46B rotates to the left centering the rotary shaft 47 by the driving means (not shown) whereby the second area S2*b* is folded onto the first area S2*a* (refer to FIG. 2B), and then, the second rotating plate 46C rotates to the right centering the rotary shaft 48 by the driving means (not shown) whereby the third area S2*c* is folded onto the second area S2*b* (refer to FIG. 2C). In the embodiment, the width in the right-and-left direction of the third area S2*c* is set to be shorter than the width in the right-and-left direction of the second area S2*b* in advance, therefore, when the second and the third areas S2*b* and S2*c* are folded, a certain area along the folding edge in the second area S2*b* is exposed without being covered with the third area S2*c* to form an adhesive margin "a" (refer to FIG. 2C).

Thus, in a state where the second sheet S2 is folded, the folding plate 46 advances to the position under the pressing means 20 driven by the linear motor M5, and the lifting means 46D lifts the second sheet S2 to a predetermined height, and then stands by there.

Figure 2D:
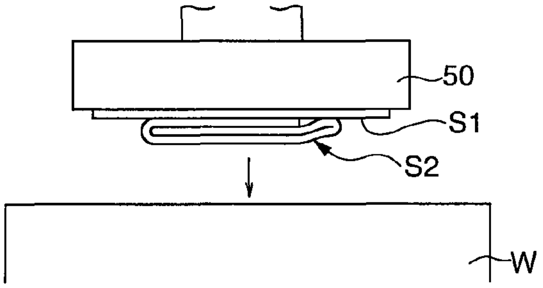

Next, the suction plate 50, which has been in the standby state with the first sheet S1 sucked and held, moves downward, and sticks so as to overlap the adhesive layer side of the first sheet S1 on the folded second sheet S2. In so doing, the second sheet S2 is overlapped so as to be positioned within a perforated-line C on the first sheet S1 so that they are overlapped together in a state where one edge side in the second sheet S2 is a predetermined amount protruded out of one edge side of the first sheet S1 in the longitudinal direction. Such a partially protruded overlapping state can be made by performing displacement of the pressing means 20 by a predetermined amount in a direction perpendicular to the paper surface in FIG. 1. And, because the second area S2*b* in the second sheet S2 has the adhesive margin "a" which is not covered with the third area S2*c*, as shown in FIG. 2D, the upper surface of the third area S2*c* and the adhesive margin "a" are to be stuck to the adhesive layer of the first sheet S1. Therefore, such a disadvantage that the folded state of the folded second sheet S2 is to be loosened after releasing from support by the folding plate 46 does not occur.

Thus, in this way, when the second sheet S2 is stuck to the first sheet S1, the folding plate 46 retracts to the initial position, and then stands ready to the next folding operation of the second sheet S2.

Then, a sensor (not shown) detects that the adherend W is conveyed to right under the pressing means 20 and is stopped by a stopper (not shown), the suction plate 50 further moves downward and sticks the adhesive layer of the first sheet S1 which is exposed outside of the second sheet S2 to the adherend W, and then, a returning operation to the position indicated in full line in FIG. 1 is carried out.

In the state where the first sheet S1 is stuck to the adherend W, and the second sheet S2 is held in between them, as shown in FIG. 3, they are maintained in the state where one edge side of the second sheet S2 in the longitudinal direction is a predetermined amount protruded out of one edge side of the first sheet S1 in the longitudinal direction, thereby allowing to be aware of the existence of the second sheet S2 easily.

Therefore, according to the embodiment as described above, printing of the confidential information and the like can be performed using the second sheet S2 which has a larger plane area than that of the first sheet S1, thereby allowing for response to increase in information volume to be printed without difficulty. Also, there is no need to enlarge the plane area of the first sheet S1, thereby allowing for response to even when the adherend area of the adherend W is small.

The best arrangement, method and the like for carrying out the present invention have been disclosed so far. However, the present invention is not limited to the above.

That is, the present invention has been illustrated and described mainly about a specific embodiment. However, it is possible for those skilled in the art to add various modifications, if necessary, to the above-described embodiment with respect to the shape, position and/or disposition without departing from the technical spirit and the range of the object of the present invention.

For example, in the above embodiment, a case where the first and the second sheets S1 and S2 are overlapped together in a state where a part of the second sheet S2 is protruded out of the exterior edge of the first sheet S1 has been illustrated and described. However, the second sheet S2 may be overlapped to be positioned within the surface of the first sheet S1.

And, the first and the second sheets S1 and S2 may be applied commonly to other objects on which confidential information is required to be concealed without leaking out, and also various changes such as the planar shape of the first and the second sheets S1 and S2, and the relative plane area therebetween may be made as long as the confidential information can be concealed.

Also, in the above embodiment, such an arrangement has been described that the first and the second sheets S and S2 which are temporarily stuck to the first and the second release liners RL1 and RL2 respectively are fed out, and are respectively peeled off during the feeding out. However, leaf type sheets without temporarily sticking to the release liners also may be used respectively.

Further, when the first and the second sheets S1 and S2 which are printed in advance are adopted, there is no necessity to perform printing during the feeding out. In this case, the first and the second printing means 12 and 16 can be omitted.

Furthermore, the second sheet S2, not limited to the case to be folded into three, may be folded into two. Also it is capable of increasing the number of folding times by additional installation of the rotating plates.

Still further, the lifting means 46D may be arranged with not only a cylinder but also other driving means such as a motor.

What is claimed is:

1. A sheet sticking apparatus, comprising:

a first feeding means for feeding out a first sheet having an adhesive layer on one surface thereof;

a second feeding means for feeding out a second sheet;

a folding means for folding the second sheet; and a pressing means for sticking the folded second sheet to the adhesive layer side of the first sheet so as to be overlapped together, and for pressing the first sheet in a state where a part of the adhesive layer is exposed to stick on an adherend;

wherein the folding means has a lifting means for moving the folded second sheet upward and downward.

2. A sheet sticking apparatus, comprising:

a first feeding means for feeding out a first raw sheet in which a first sheet having an adhesive layer is temporarily stuck to one surface of a strip-shaped first release liner;

a second feeding means for feeding out a second raw sheet in which a second sheet is temporarily stuck to one surface of a strip-shaped second release liner through an adhesive layer;

a folding means for folding the second sheet after peeling the second sheet from the second release liner; and a pressing means for overlapping the folded second sheet with the adhesive layer side of the first sheet after peeling the first sheet from the first release liner, and for pressing the first sheet in a state where a part of the adhesive layer is exposed to stick on an adherend;

wherein the folding means has a lifting means for moving the folded second sheet upward and downward.

3. The sheet sticking apparatus according to claim 1, further comprising a first and a second printing means are provided on respective feeding out pathways of the first sheet and the second sheet for printing variable information corresponding to the adherend.

4. The sheet sticking apparatus according to claim 1, wherein the second sheet is formed to be substantially rectangular shaped, and has a middle portion formed as a first area, and both sides thereof respectively formed as a second and a third areas, the folding means folds the second sheet into three in the order of the second area and the third area so as to be mutually overlapped together, and a certain area along the folding edge in the second area in a state of being folded into three is not covered with the third area to form an adhesive margin toward the adhesive layer.

5. The sheet sticking apparatus according to claim 1, wherein the folded second sheet is stuck to the adhesive layer in a state of partially protruding out of the exterior edge of the first sheet.

6. The sheet sticking apparatus according to claim 1, wherein the folded second sheet is stuck to the adhesive layer in a state of not protruding out of the exterior edge of the first sheet.

* * * * *